United States Patent [19]

Kaufman et al.

[11] Patent Number: 5,991,411
[45] Date of Patent: Nov. 23, 1999

[54] METHOD AND MEANS FOR LIMITING ADVERSE USE OF COUNTERFEIT CREDIT CARDS, ACCESS BADGES, ELECTRONIC ACCOUNTS OR THE LIKE

[75] Inventors: James Harvey Kaufman; Glenn Tavernia Sincerbox, both of San Jose, Calif.

[73] Assignee: International Business Machines Corporation, Armonk, N.Y.

[21] Appl. No.: 08/729,256

[22] Filed: Oct. 8, 1996

[51] Int. Cl.⁶ .................... H04L 9/32; H04L 9/00; G06K 5/00; G07F 7/08
[52] U.S. Cl. .................... 380/24; 380/23; 380/25; 380/49; 235/379; 235/380; 340/825.31; 340/825.34; 705/26; 705/35; 705/39; 705/44
[58] Field of Search .................... 380/24, 25, 23, 380/49, 50, 3; 235/379, 380; 340/825.31, 825.34; 705/26, 35, 39, 41, 44

[56] References Cited

U.S. PATENT DOCUMENTS

| | | |
|---|---|---|
| 3,617,638 | 11/1971 | Jochimsen ............................ 179/2 |
| 4,628,195 | 12/1986 | Baus ................................. 235/440 |
| 4,755,660 | 7/1988 | Nakano ............................. 235/380 |
| 4,864,618 | 9/1989 | Wright et al. ....................... 380/51 |
| 4,900,903 | 2/1990 | Wright et al. ..................... 235/380 |
| 4,959,788 | 9/1990 | Nagata et al. .................... 364/408 |
| 5,097,115 | 3/1992 | Ogasawara et al. .............. 235/380 |
| 5,317,636 | 5/1994 | Vizcaino ............................ 380/23 |
| 5,613,001 | 3/1997 | Bakhoum ............................ 380/4 |
| 5,742,684 | 4/1998 | Labaton et al. ..................... 380/24 |

*Primary Examiner*—Bernarr E. Gregory
*Attorney, Agent, or Firm*—James C. Pintner; Khanh Q. Tran

[57] ABSTRACT

A system for rejecting second and subsequent copies of an informationally-equivalent card or badge asserted into a client/server system by processing only those cards having transaction histories recorded thereon by comparison matching a history recorded in a central repository and then rewriting the history on the card and in the repository. The rewritten histories include the current transaction. Counterfeit cards, informationally equivalent to the original card prior to the transaction update of the original card, will be rejected when asserted into the system since their histories mismatch that recorded in the repository.

11 Claims, 7 Drawing Sheets

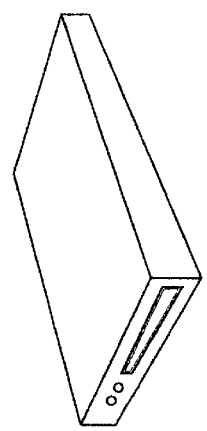
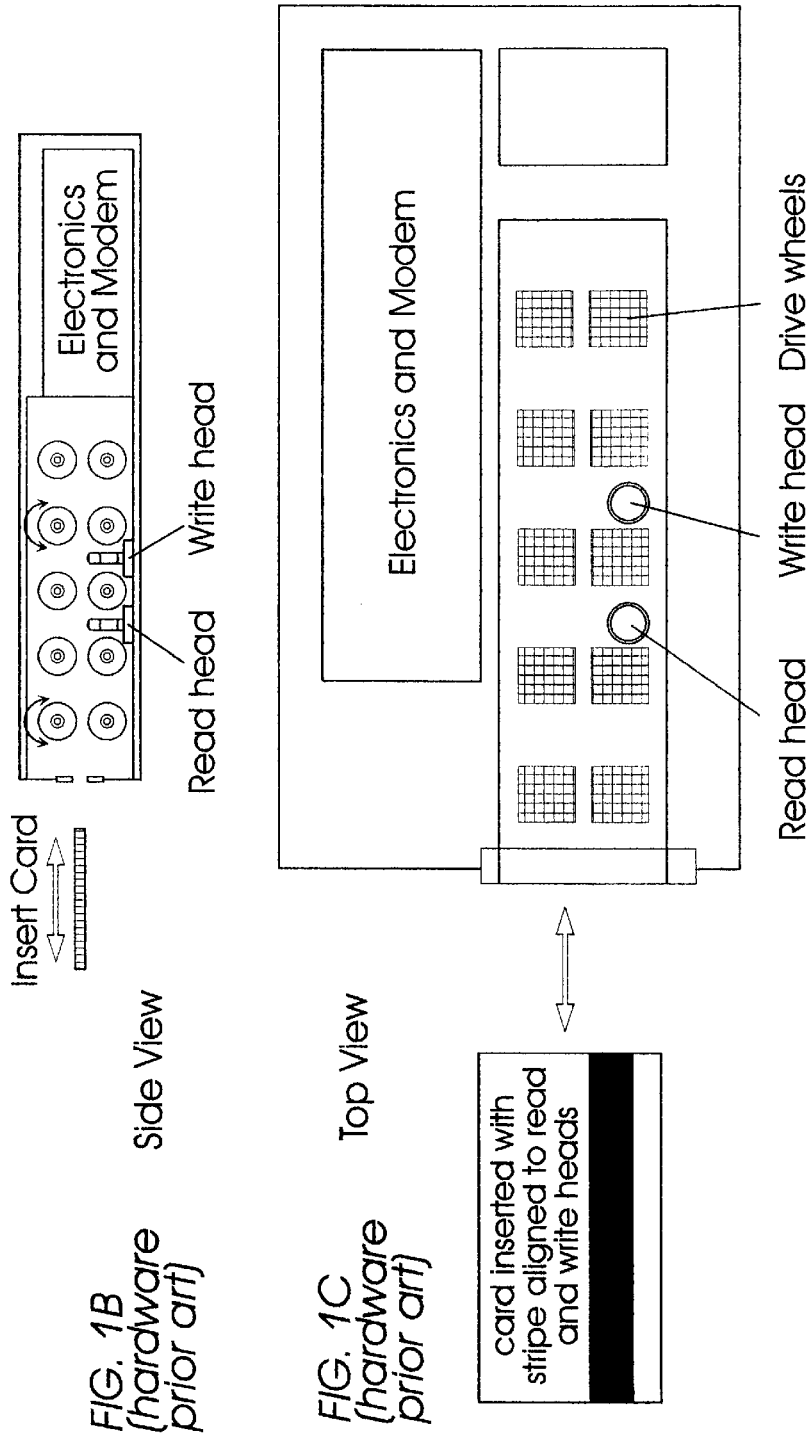
Credit Card Scan/Write Interface
FIG. 1A
(hardware prior art)
Axonometric View
FIG. 1B
(hardware prior art)
Side View
FIG. 1C
(hardware prior art)
Top View Flow of control for processing card data per the invention at a point of sale such as a merchant, automatic teller, badge reader, or the like.

Flow of control according to the invention

METHOD AND MEANS FOR LIMITING ADVERSE USE OF COUNTERFEIT CREDIT CARDS, ACCESS BADGES, ELECTRONIC ACCOUNTS OR THE LIKE

FIELD OF THE INVENTION

This invention relates to credit/debit cards, access badges or the like which customarily have electronic keys and related information recorded thereon. More particularly, the invention relates to limiting adverse use of counterfeit cards or badges which are asserted at host-based card or badge readers, automated tellers, communications media such as the Internet, or in like context in order to gain physical access or to obtain financial and similar advantage.

DESCRIPTION OF RELATED ART

Credit cards, debit cards, access badges or the like are devices frequently used to grant or extend access or financial favor to the bearer. The legal presumption, although refutable, is that the bearer is the rightful possessor of the card or badge and that the card or badge is evidence of a claim of right for which the bearer is lawfully asserting it. Clearly, counterfeiting of such cards or their electronic embodiments increases the likelihood of commercial fraud, trespass or worse upon innocent participating customers, merchants, and providers of electronic commerce.

Electronic commerce permeates every point of sale or vendor contact, whether person-to-person or over a man/machine interface. At person-to-person points of sale, credit or debit cards are used by customers as secured payment for goods and services. A vendor will either check indicia coded on the card by manual referral to a list of unauthorized cards or preferably cause the card to be sensed by a card reader coupled to a processor for a comparison match between selected sensed indicia and prestored or calculated information. A match would result in credit or access being extended, while a mismatch would result in a refusal.

The prior art is replete with methods and means to limit fraud or trespass resulting from use of counterfeit cards. Such methods and means have focused on increasing the tamper or the counterfeiting resistance of the cards or the indicia recorded thereon. Examples may be found in Baus, U.S. Pat. No. 4,628,195, "Credit Card Security System", issued Dec. 9, 1986; and Vizcaino, U.S. Pat. No. 5,317,636, "Method and Apparatus for Securing Credit Card Transactions", issued May 31, 1994.

Baus argues that no two planar magnetically-striped cards will record even the same indicia in exactly the same way. That is, there are some card-to-card recording variations which itself can be encoded as a signature of the original card. Thus, if Card B was a replication of Card A, there are perceptible card-to-card differences in positions of magnetically-recorded characters and physical vertical references on the cards. If a security number was computed and stored at a host at the time a card was originated as some function of the position of magnetically-recorded or embossed characters and physical references, then routine computation of that function derived from a replicate would not comparison match.

Vizcaino takes a different tack. Vizcaino views counterfeiting of credit cards as a form of a cryptographic attack. That is, he avoids the card being compromised by constantly changing a card-stored key and by assuming that the decrypting algorithm as used by a host processing the data is unknown to the intruder. He presupposes a "smart card" having some computing means embedded therein for generating a different "key" each time the card is used by changing the "seed" or transaction number, such as by incrementing. Both the smart card and its antipodal host start from the same key-based information state. Presumptively, the host will also increment to maintain state synchronism with the smart card.

Such anticounterfeiting measures vary in their effectiveness and substantially increase the cost of card initiation or processing complexity. Indeed, many of the antifraud and privacy securing measures being implemented on the Internet electronic commerce highway rely on elaborate cryptographic security and authentication protocols. In this regard, reference can be made to SSL (Secure Sockets Layer) designed by Netscape Communications Corporation. This protocol is layered beneath application protocols such as HTTP, SMTP, Telnet, FTP, Gopher, and NNTP and is layered above the connection protocol TCP/IP.

In today's commercial and legal environment, credit card security is of special concern to vendors. Typically, banks processing these matters will automatically debit a vendor's merchant account whenever a customer complains that their credit card has been misused. Unless a vendor can produce a Universal Credit Card Form signed by a customer, the vendor is not likely to prevail in any dispute. Where cards have been counterfeited in substantial numbers, the window of opportunity as perceived by the counterfeiter is a matter of hours within which to cash in. The vendor liability is both direct and immediate.

SUMMARY OF THE INVENTION

It is accordingly an object of this invention to devise a method and means for limiting the aggregate exposure of one or more vendors to multiple copies of the same counterfeit credit and debit cards, access badges and the like by way of reliable detection of such adverse use by existing instrumentalities in electronic channels of commerce.

It is a related object that such method and means rely upon ordinary and usual magnetic card stripe and equivalent technology for encoding and recording information on cards and badges, reading information from cards and badges, and processing the information so sensed or read.

It is yet another object that any information credibility checking of the cards or badges minimize false positive or false negative rejections.

The aforementioned objects are satisfied by a method and means for limiting the adverse use of counterfeit copies of credit cards, badges and other personal hand carried or displayed media using dynamically-alterable keys and locks. Such use of dynamically-alterable keys also applies when an electronic version of a credit card is involved. When credit card or account information is to be transmitted over the Internet, the key may consist of a data file/record stored, for example, on magnetic diskette at a client terminal while the lock/unlock operation is performed when comparison matching a data file or record stored at a remote telephonically-coupled server or the like.

The invention relies upon the unexpected observation that the likelihood that the history of transactions recorded on two identical cards wielded by different bearers would be the same is near zero. That is, if the transaction history of a first card were to be used as the dynamic changeable key and accurately recorded on the card in a central repository, then use of an illegitimate copy of that card would be immediately ascertained since its locally recorded history would certainly mismatch the transaction history as recorded in the repository. This would still permit the first card to be used.

Nevertheless, for N cards it would detect all use of N−1 other presumptively counterfeit copies of the same card.

The method and means of this invention contemplate recording a portion of recent transaction history on both the card and a local or remote access or credit-authorizing facility. In the event that the card becomes counterfeited and is used to secure access or credit, then the first use will cause the transaction sequence recorded on both the card and remote authorizing facility to change. This pertains whether or not the transaction is approved by the remote processor. Second and subsequent users of other cards will be barred since there will be a comparison mismatch between the transaction history recorded on the second and subsequent user cards and that of the remote facility. There is neither need for special card attribute encoding functions, as in the previously-described Baus reference, nor one-time keys and related synchronous state cryptographic encoding or decoding measures, as set out in the aforementioned Vizcaino reference.

The focus in this invention is to limit the extent of access by a plurality of replicated cards or account numbers as a whole. This is in contrast to the prior art which seeks to foreclose unauthorized use by all individual cards. In this regard, the first card can continue to secure access until repudiated by other means.

More particularly, the method and means of this invention would preferably encrypt on a credit card a small refreshable encoded record which specifies where the card was last used when it was last scanned for approval of a commercial transaction. The record of this latest transaction is recorded on the card whether or not the transaction was actually approved. When the card is scanned at the point of sale, all of the credit card information is read, along with the coded record of the last transaction. Concurrently, the record is overwritten or appended with a new encrypted code for the present transaction. Such information can be augmented with voice-recorded information obtained from the card bearer. All this information is sent to the credit card approval computer which performs all of the usual checks. Additionally, the last transaction code is checked against a database at the host in order to ascertain whether this card is in fact the same card that made the latest recorded skeletal transaction (as opposed to a telephone pick order or transaction). If not, the card is invalid. Again, this results whether or not the recorded transaction was approved. If valid, the new transaction record is added to the card company database and labeled as the latest transaction.

Electronic commerce is also conducted over the Internet or World Wide Web where a customer with no more than a computer and modem will telephonically be connected to a vendor home page or web site and seek access to goods or services. The vendor will provide an interactive page or screen and request ordering data from the customer. The customer enters the data from his terminal, including credit/debit card account information. The data, as received, is then processed by the website. Preferably, the transaction history associated with that account number and recorded locally and/or at a remote server would include a date/time stamp. It could be calibrated to fractions of a second. Then, if the account was processed according to the method of the invention, any confounding between first and second assertions of the same account number would be eliminated.

BRIEF DESCRIPTION OF THE DRAWING

FIGS. 1A–1C depict a processing station capable of reading sensed indicia on a coded card and also of overwriting or updating any coded indicia on said card in an angled, side and plan view, respectively.

DESCRIPTION OF THE PREFERRED EMBODIMENT

Figure 2:
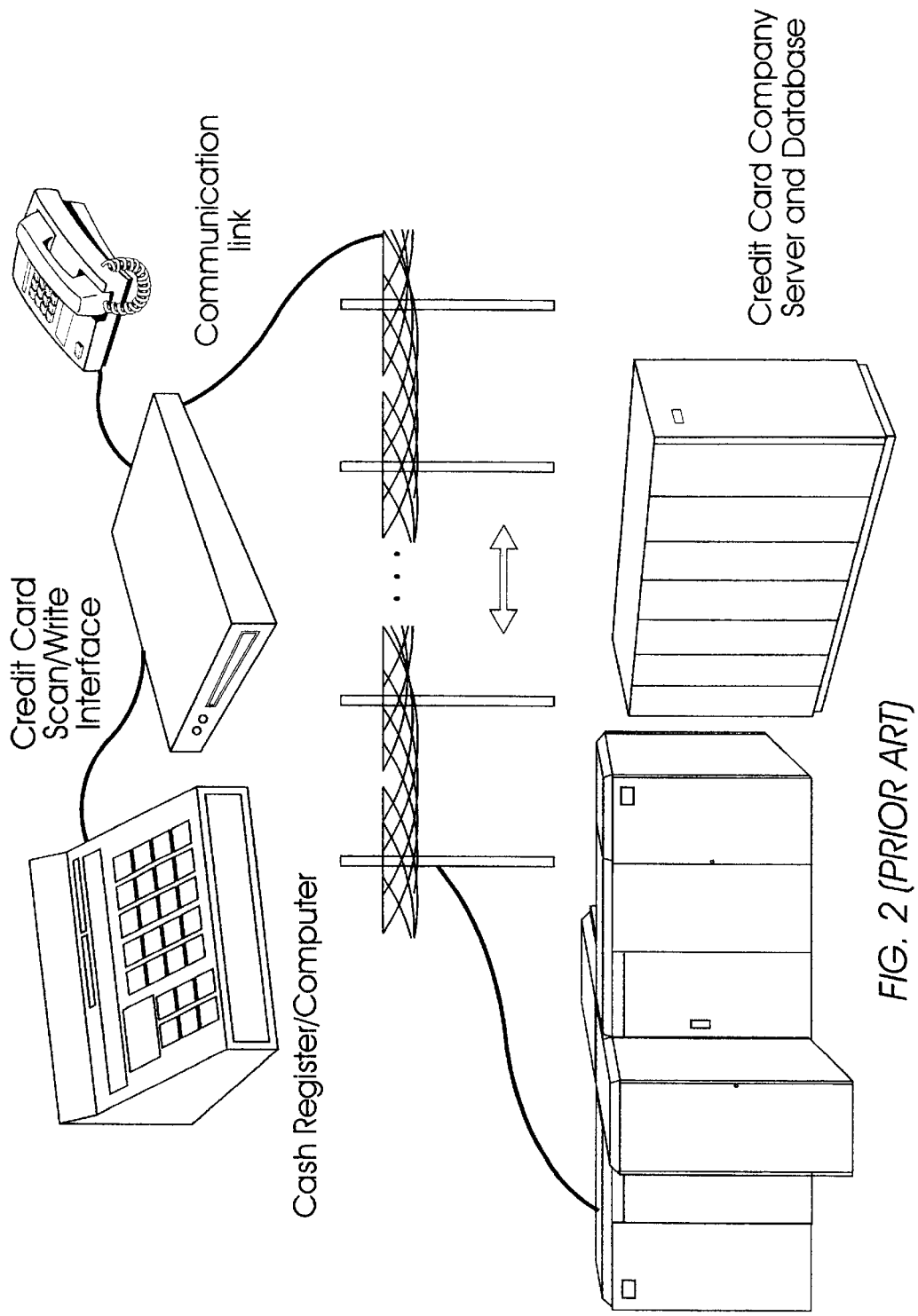
FIG. 2 shows a standard coupling local processor between a card station or automatic teller or the like and a remote server, such as one connected via a telephone channel.

Referring now to FIG. 1 of the drawing, there are shown related views in FIGS. 1A–1C of a usual and standard reading and writing configuration. A typical card comprises a plastic substrate and may include one or more magnetic or optically-readable and writable media, in addition to permanently-embossed information such as serial number, photograph, fingerprint, and the like. The permanently-embossed information is used to identify the authorized bearer or owner of the card. The information recorded on a magnetic or optically-readable stripe in this invention would include coded indicia of recent transaction history.

The notion of transaction history is a general one. It can consist of any time series of requests to access a gate locked by a badge reader or a series of recent purchases identifying essential goods, transaction number, date and time, etc. Preferably, the time series would consist of two or more transactions so as to reduce the likelihood of coincidence. It follows parenthetically that the longer the transaction sequence, the smaller the confounding. The term "confounding" merely refers to the false positive that a history on a second card would be identical to the transaction history on a first card.

Referring now to FIG. 1A, there is shown an axonometric view of a transducer. FIG. 1B depicts a side view in which the card is inserted in the horizontal plane and urged in a direction over a read or write head. The read head senses the permanent and transaction history indicia. Realistically, FIG. 1C sets out a plan view in which motorized rollers or an equivalent mechanical detection means effectively friction engage the card and pass it over the appropriate read or write heads in the opposite direction for return to the bearer.

Referring now to FIG. 2, there is set out a transducer in telephone path coupling relation to a remote processor. Both embodiments in FIGS. 1 and 2 merely reflect the state of the hardware art and are included for purposes of completeness. Processing of card-sensed indicia can of course be accomplished locally or remotely from the card reader. Typically, in the case of credit or debit cards, banks or credit card companies such as American Express or Bank of America would provide a remote server providing processor support to many thousands of vendor clients.

The server preferably is a computer of the type having sufficient processing power and memory capacity to optimistically communicate with a plurality of servers asynchronously, or to at least pessimistically communicate with them synchronously. That is, if the bandwidth used by the number of client transducers is low relative to the available processor bus attachment bandwidth, then the communications attachment protocol can be asynchronous. However, if the bandwidth utilization is high, then the attachment protocol would be synchronous or scheduled only. The server design should preferably take into account that should the number of client transducers or their activity be high, then the transactions will be short and bursty. A relational database when stored, for example, on a RAID 5 disk-based storage subsystem should adequately support the high concurrency rate and bursty client/server communications traffic.

Figure 3A:
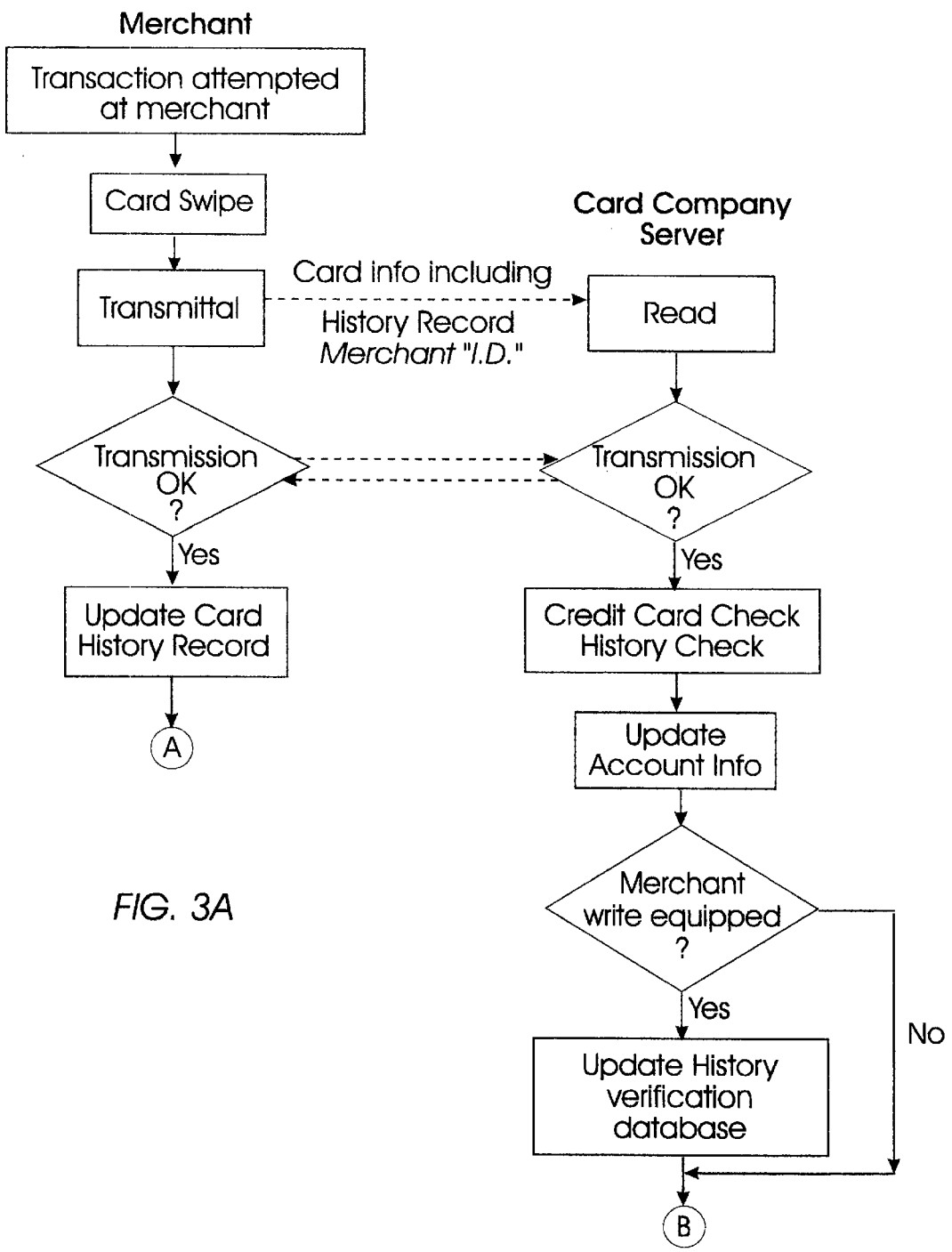
FIGS. 3A–3B set forth a flow of control renditions of the method and means of this invention wherein the point of sale is a conventional department store, cashier, automatic teller, badge reader or the like, including the comparison match between transaction histories recorded on the card and the server and the overwriting of the recent history on the card and server.
Figure 3B:
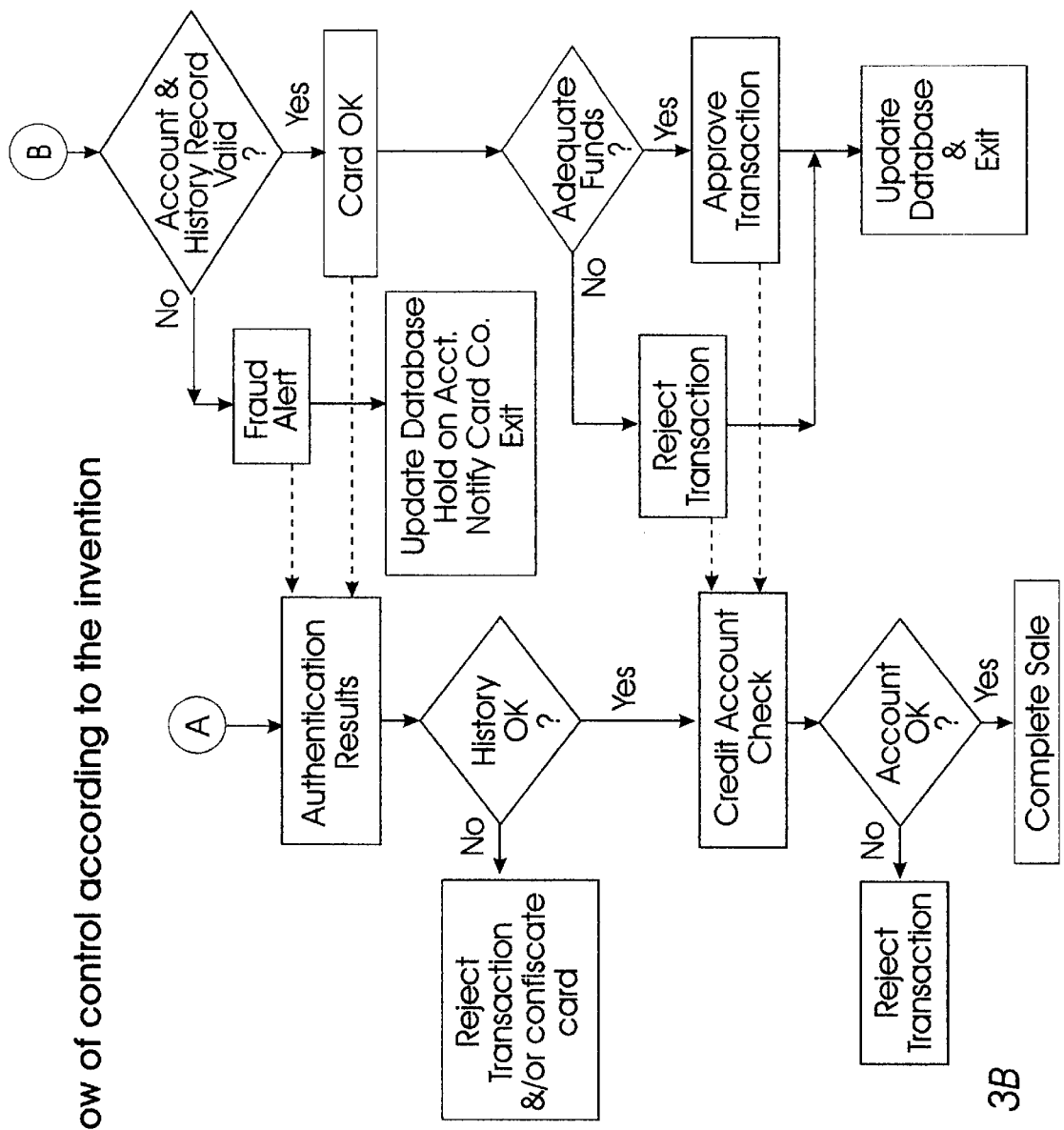
Figure 4A:
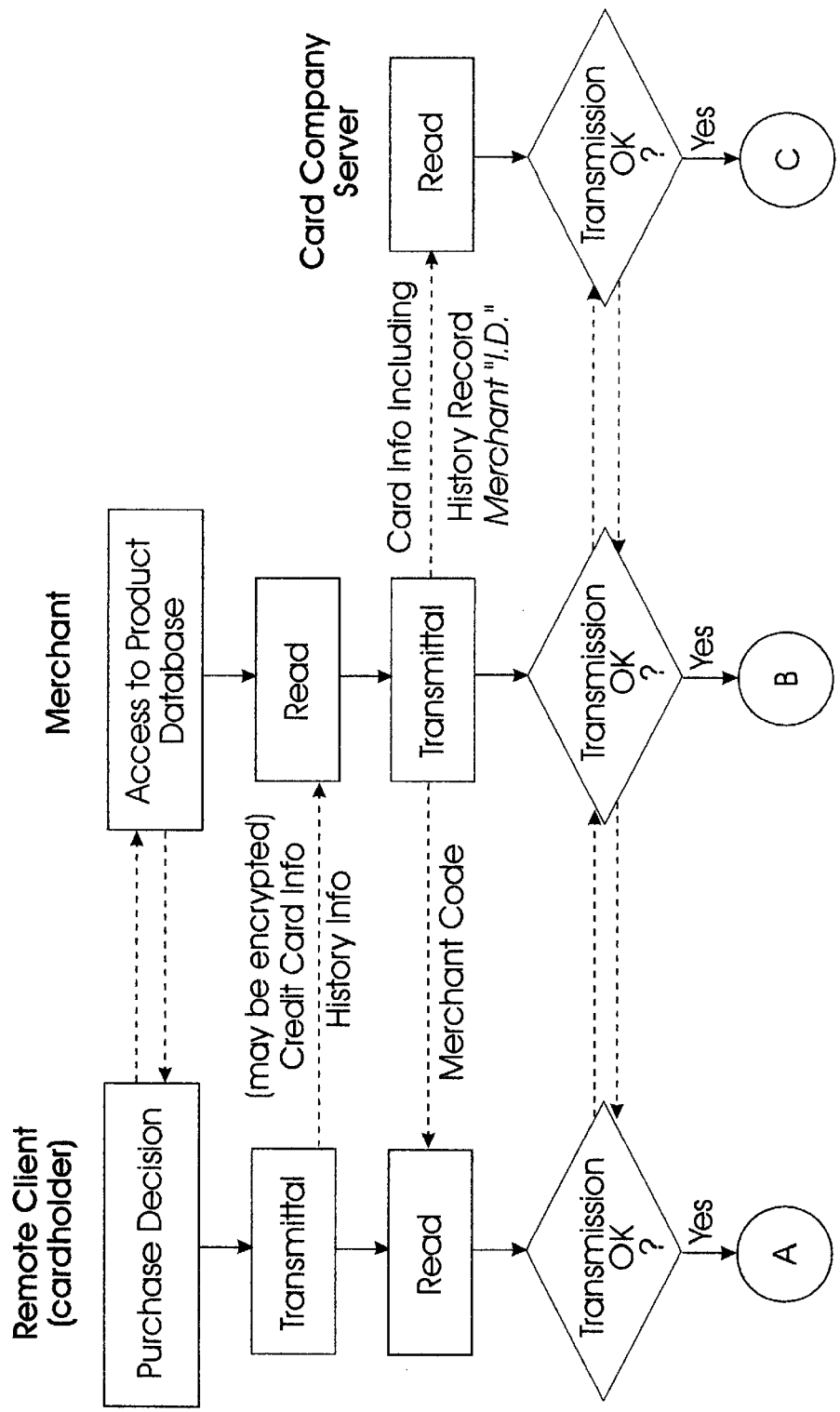
FIGS. 4A–4B illustrate the flow of control of the invention where a credit card account information is electronically asserted on the Internet or World Wide Web or the like and processed according to the invention.
Figure 4B:
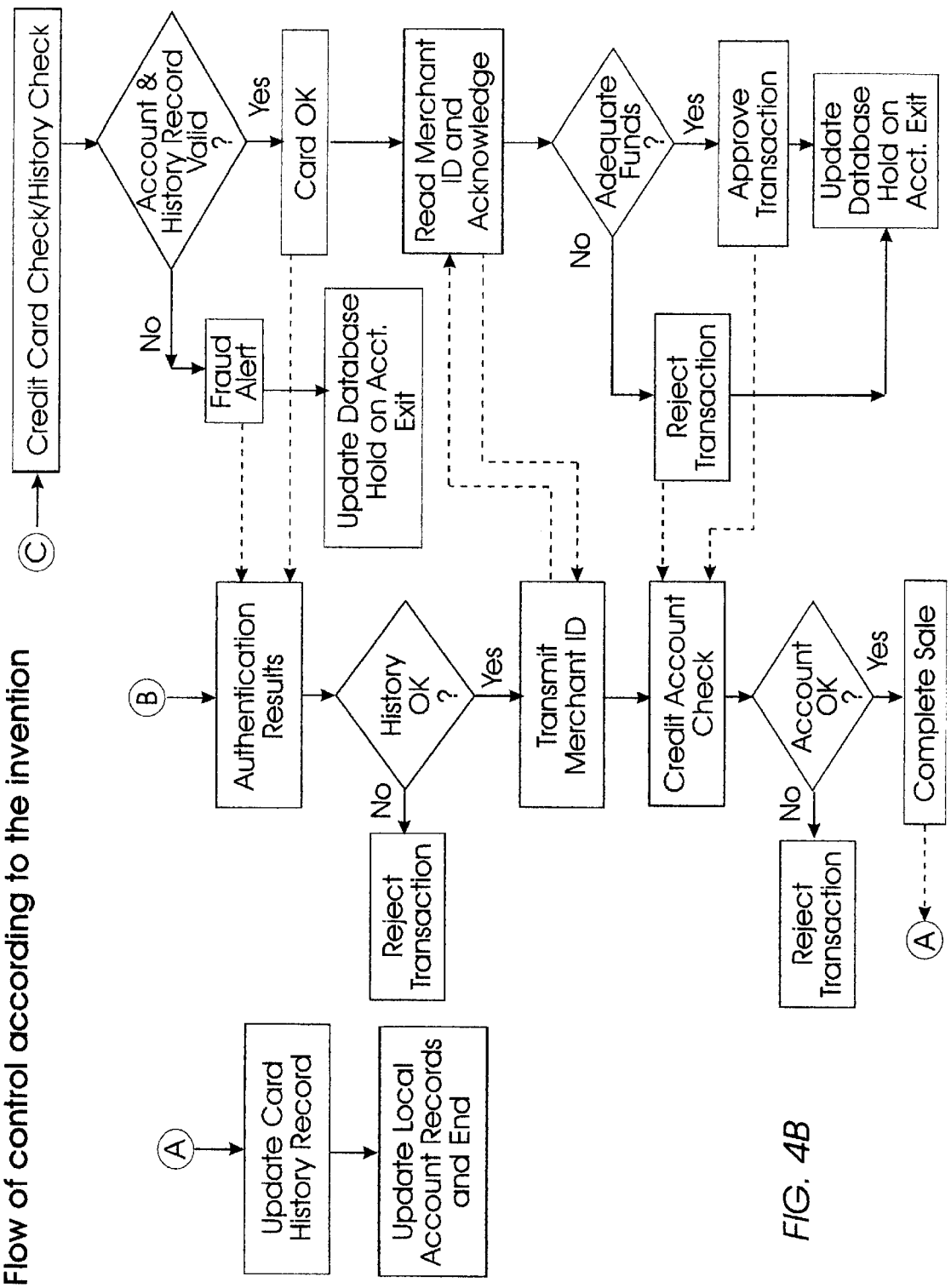
Figure 5:
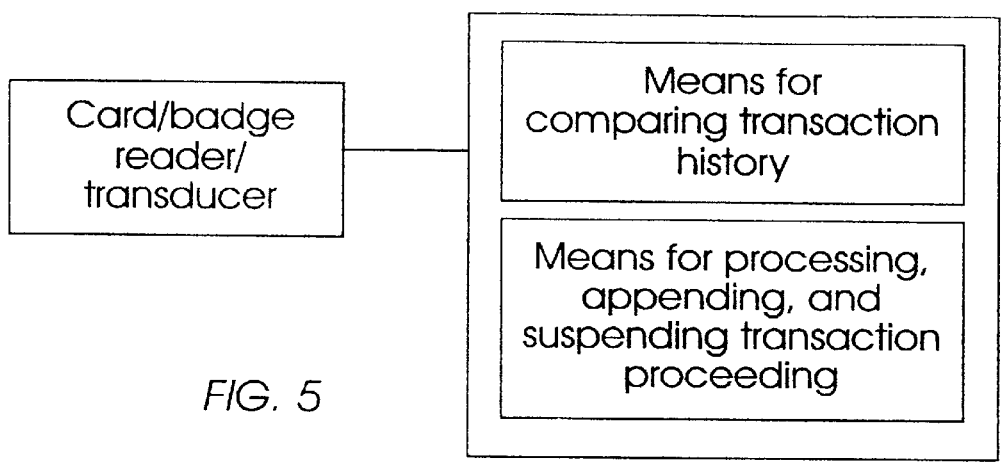
Figure 6:
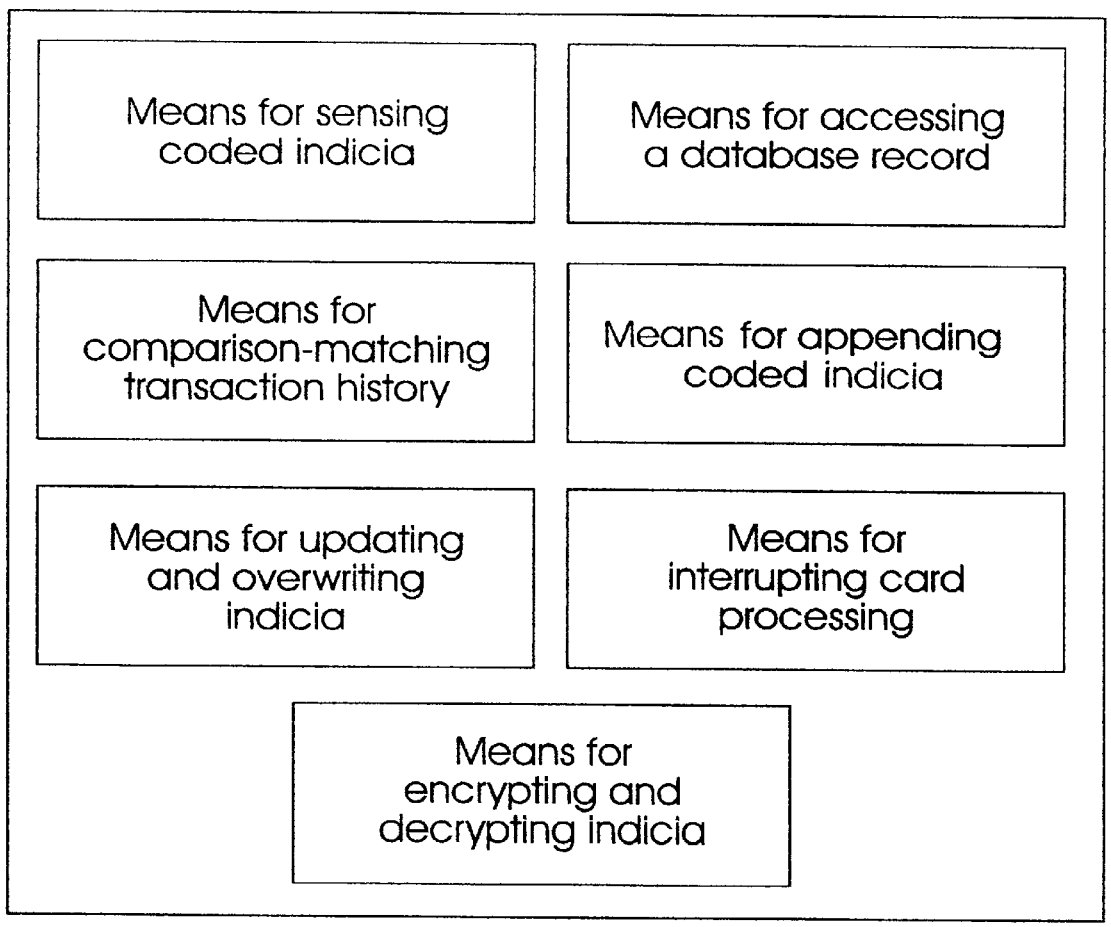

Referring now to FIGS. 3A–3B and 4A–4B, there is shown flow of control relations at a point of sale and with a source of credit or access authorization. In FIGS. 3A–3B, the point of sale is a cashier, badge reader, automated teller or the like, while FIGS. 4A–4B relate to use of electronic account numbers when asserted on the Internet or World Wide Web.

Ordinarily, a customer makes a purchase decision at a point of sale and secures payment by inducing a credit source, such as a bank or American Express, to extend credit on his behalf in order to secure the goods or services from the point of sale. The customer usually tenders an instrument in the form of a credit or debit card. For security purposes, a vendor might request additional identification, such as a driver's license. At this point, the vendor preferably inserts the card into a transducer, such as is shown in FIGS. 1 and 2. The transducer reads the permanent indicia and the history information from the readable stripe or equivalent on the card. Both the identification and the history record are transmitted to the source of credit authorization. This source operates a processing facility as a functional server to a plurality of client card readers/writing means.

At the server, the identification read from the card is used as an index to obtain the credit record associated with the use of the card from a database associated with the processor server. A history of recent transactions forms a part of the credit record and is compared with the history read from the card.

The information constituting a record of a transaction would typically involve the card or account number, the store, transaction number, date and time, nature of goods or services, and the amount. It could minimally consist of a key and a date time stamp.

Since the transaction history trace constitutes dynamically changing information, then it is most susceptible to false positive and false negative in the interpretation thereof. In this regard, the term "false positive" means that the indicia of recent transaction history is assumed to be accurate even though some of the indicia are in error, while the term "false negative" means that some of the indicia are considered to be in error when they are in fact accurate. The term "error" includes both "errors" and "erasures". False positives and false negatives in the transaction history trace can be eliminated by encoding the history traces recorded on the card and in the database-stored record using any standard error detection and correction coding algorithm generating a redundancy number and pending the trace and recorded on the card or record. When the card or badge is sensed, the redundancy number can be calculated thereover and compared with the previously-recorded number for purposes of error detection/correction.

Since the method and means of this invention use conventional client/server credit information processing and communications apparatus, an appreciation of such operation is believed well within the skilled artisan. The advance is limiting adverse use of cards, badges or the like at readers or on the Internet by comparison matching of recent transaction history as recorded on a card or its electronic artifact and a record maintained at a central repository as indexed by card identification indicia, updating the first use of such card on both the card and the repository, and detecting mismatches for all illegitimate assertions of the card either by counterfeit copies or by electronic artifact subsequent to the first use.

The difference between the embodiments shown in FIGS. 3A–3B and 4A–4B is that in the latter, the customer computer maintains what amounts to an encrypted version of a credit card. This encrypted version is sent to the point of sale over the modem/phone connection and of course includes a history of its most recent transactions. Now, the very first assertion of the "electronic card" will undoubtedly match the repository history. Significantly, the repository will send back an encrypted version of the card ID and the transaction history, including the most recent transaction which must be recorded. Other computers asserting the card number illegitimately will obviously not have the same encrypted history.

It is reiterated that the dynamically-changeable lock is in the form of the recent transaction history trace, preferably encrypted, and recorded on a magnetic or optical stripe of a credit card or badge or on a fixed disk or the like of a client terminal for the electronic card artifact. The dynamically-changeable lock takes the form of the counterpart trace recorded at any central repository or server in a client/server system. The first use of a replicated card and the comparison equality of the traces results in the history trace on the first used card and the repository being updated by the latest transaction. Subsequent use by second and other copies of the card or assertions of electronic versions from various terminals must necessarily fail since the history trace of the card/terminal and the repository will not compare equally.

These and other extensions of the invention may be made without departing from the spirit and scope thereof as recited in the appended claims.

We claim:

1. A system for rejecting second and subsequent copies of an informationally equivalent credit/debit card, identification badge or an electronic artifact thereof asserted by way of one or more client terminals into a client/server system, said cards, badges and terminals having a writable portion thereof, comprising:

(a) means at the server and responsive to an assertion at a terminal or the like of a first card, badge, or an electronic artifact thereof for comparison matching of a history of recent transactions as recorded at the server and on the writable portion of the first card, badge or as a file at a client terminal for the electronic artifact;

(b) means at the server and responsive to a comparison match of the histories for updating and recording the history including a current transaction at the server, on the writable portion of the card or badge, or at the client terminal and, and for continuing the card processing; and (c) means at the server and responsive to an assertion of alleged other copies of the first card, badge or of an electronic artifact, said means including:

(1) means for repeating step (a) and for suspending further operations with respect to the asserted alleged other copies of the first card, badge, or electronic artifact, if the histories comparison mismatch, and (2) means for repeating step (b) if the histories comparison match.

2. A method for limiting adverse use of counterfeit copies of a card or badge having indicia coded thereon, said card or badge and said counterfeit copies being used by at least one bearer to secure either access or credit at a gated entry or a point of sale terminal or the like, comprising the steps of:

(a) sensing coded indicia recorded on said card or badge indicative of bearer identity and a history of time-displaced transactions in which said card or badge was asserted;

(b) accessing a record from a database through an information processor indexed according to the bearer identity sensed from said card or badge, said record including a history of time-displaced transactions in which said card or badge was asserted;

(c) comparison matching the history of time-displaced transaction indicia sensed from the card or badge with that in the accessed record;

(d) in the event of a comparison match, appending coded indicia to the database-stored record indicative of a current transaction and overwriting indicia recorded on said card or badge with indicia including that indicative of the current transaction; and (e) in the event of a comparison mismatch, interrupting further processing of said card or badge and providing signal indication that the card being processed is a questionable or a counterfeit copy.

3. The method according to claim 2, wherein the card or badge is of a type having permanent identification indicia coded thereon and history of transaction indicia written on a recording medium integral to said card, said recording medium being of a type selected from a set consisting of remanent hysteretic magnetizable media and optically permeable media having selectively alterable reflective or transmissive properties.

4. In a client/server system of a type in which at least a portion of information electronically recorded on cards or badges being dynamically alterable, a first card or badge of a plurality of informationally-equivalent cards or badges when asserted in a client terminal of said system causing the server to be altered from a first to a second state upon a comparison match between information recorded on said first card or badge and previously recorded at the server, a second informationally-equivalent card or badge when asserted at a subsequent point of time in a client terminal causing the server to be altered from a first to a third state upon a comparison mismatch between information recorded on said second card or badge and previously recorded at the server, wherein the improvement comprises the steps of:

(a) sensing information from a card or badge asserted into the client terminal;

(b) accessing a record from a database through a processor at the server as indexed according to the information sensed from said card or badge;

(c) comparing the sensed and recorded information in the form of a history of transactions as sensed from the card or badge with that of a counterpart history located in the accessed record; and (d) further processing of the card or badge only in the event of a comparison match of the information, appending information to the database-stored record indicative of the current transaction, and overwriting information previously recorded on said card or badge with at least a portion of the history including that indicative of the current transaction.

5. A system for rejecting second and subsequent copies of an informationally-equivalent card or badge asserted into the system, each of said cards or badges including an electronically-rewritable portion thereof, and comprising:

at least one card or badge transducer responsive to the assertion of a card or badge for sensing indicia either permanently or rewritably encoded thereon; and a processor coupling said card or badge transducer and responsive to the sensed indicia for interpreting at least a portion of the sensed indicia as a card or badge identification, for interpreting another portion of the sensed indicia as a history of transactions associated with said card or badge, and for extracting a record indexed by said identification, said record containing the history of transactions associated with said card from a collection of records, said processor further comprising:

means for comparing the history of transactions sensed from the card or badge with that counterpart history located in the accessed record; and means for further processing of the card or badge only in the event of a comparison match of the histories, for appending coded indicia to the database-stored record indicative of the current transaction, and overwriting indicia previously recorded on said card or badge with indicia of at least a portion of the history including that indicative of the current transaction.

6. The system according to claim 5, wherein the means for overwriting indicia previously recorded on said card or badge includes means for deriving an error check code number over the indicia and appending said check number to said indicia, and further wherein said processor includes means for detecting an error or erasure in at least the transaction history portion of the sensed indicia.

7. The system according to claim 6, wherein the means for overwriting indicia previously recorded on said card or badge includes means for expressing said overwriting indicia in the form of a self-clocking code.

8. The system according to claim 7, wherein said self-clocking code is selected from a set of codes where changes in Boolean coded values (0,1) are represented differentially in the form of transitions between amplitude states.

9. The system according to claim 6, wherein the means for overwriting indicia recorded on said card or badge includes means for reading back said indicia as overwritten, for computing an error check code number, and for comparison matching said computed check code number with said appended error check code number.

10. A system for rejecting second and subsequent copies of informationally-equivalent electronic credit cards or badges asserted into a client/server system by requesting ones of the client stations, comprising:

(a) means at the server for sensing coded indicia recorded at said requesting client station indicative of identity of said electronic credit card or badge and of a history of time-displaced transactions in which said card or badge was asserted;

(b) means at the server for accessing a record from a database through an information processor indexed according to the card or badge identity sensed from said client station, said record including a history of time-displaced transactions in which said electronic card or badge was asserted;

(c) means at the server for comparison matching the history of time-displaced transaction indicia sensed from said client station associated with said electronic card or badge with that in the accessed record;

(d) means at the server, in the event of a comparison match, for appending coded indicia to the database-stored record indicative of a current transaction and for overwriting or updating indicia recorded at said client station associated with said electronic card or badge with indicia including that indicative of the current transaction; and (e) means at the server, in the event of a comparison mismatch, for interrupting further processing of said electronic card or badge and for providing signal indication that the card being processed is a questionable or a counterfeit copy.

11. An article of manufacture comprising a machine-readable memory having stored therein a plurality of processor-executable control program steps for rejecting second and subsequent copies of an informationally-equivalent card or badge asserted into a system including at least one card or badge transducer coupling a processor, said memory coupling said processor, each of said cards or badges including an electronically-rewritable portion thereof, said plurality of stored processor-executable control program steps include:

(a) a control program step for sensing information from a card or badge asserted into the transducer;

(b) a control program step for accessing a record from a database through a processor at the server as indexed according to the information sensed from said card or badge;

(c) a control program step for comparing the sensed and recorded information in the form of a history of transactions as sensed from the card or badge with that of a counterpart history located in the accessed record; and (d) a control program step for further processing of the card or badge only in the event of a comparison match of the information, appending information to the database-stored record indicative of the current transaction, and overwriting information previously recorded on said card or badge with at least a portion of the history including that indicative of the current transaction.

* * * * *